United States Patent [19]

Sakaguchi

[11] 4,433,339

[45] Feb. 21, 1984

[54] DIRECT-WRITING RECORDER

[75] Inventor: Takehiko Sakaguchi, Nagano, Japan

[73] Assignee: Hioki Denki Kabushiki Kaisha, Nagano, Japan

[21] Appl. No.: 305,630

[22] PCT Filed: Jan. 23, 1981

[86] PCT No.: PCT/JP81/00016
§ 371 Date: Sep. 16, 1981
§ 102(e) Date: Sep. 16, 1981

[87] PCT Pub. No.: WO81/02201
PCT Pub. Date: Aug. 6, 1981

[30] Foreign Application Priority Data

Jan. 23, 1980 [JP] Japan ............................ 55-6520
Mar. 18, 1980 [JP] Japan ............................ 55-34554

[51] Int. Cl.³ .......................................... G01D 15/02
[52] U.S. Cl. ................................. 346/78; 346/141
[58] Field of Search ............... 346/93, 78, 141, 8, 346/135.1, 136, 6.9, 165

[56] References Cited

U.S. PATENT DOCUMENTS

| | | | |
|---|---|---|---|
| 1,521,007 | 12/1924 | Chubb | 346/69 |
| 2,433,382 | 12/1947 | Marrison | 346/17 |
| 4,042,936 | 8/1977 | Yoshikawa | 346/165 X |
| 4,178,600 | 12/1979 | King | 346/165 X |
| 4,205,323 | 5/1980 | Williams et al. | 346/165 |

Primary Examiner—E. A. Goldberg
Assistant Examiner—D. Jennings
Attorney, Agent, or Firm—Robert E. Burns; Emmanuel J. Lobato; Bruce L. Adams

[57] ABSTRACT

A direct-writing recorder of dot type causes an area of a record paper (70) which is to be printed to oscillate in a direction perpendicular to the paper plane for contact with a printing element (22) on a pointer (21) at a given periodic interval. A vibrator unit (50) is disposed at a distance below the printing element (22), and drives the record paper (70), passing between the printing element (22) and the vibrator unit (50), to be urged against the printing element (22).

9 Claims, 19 Drawing Figures

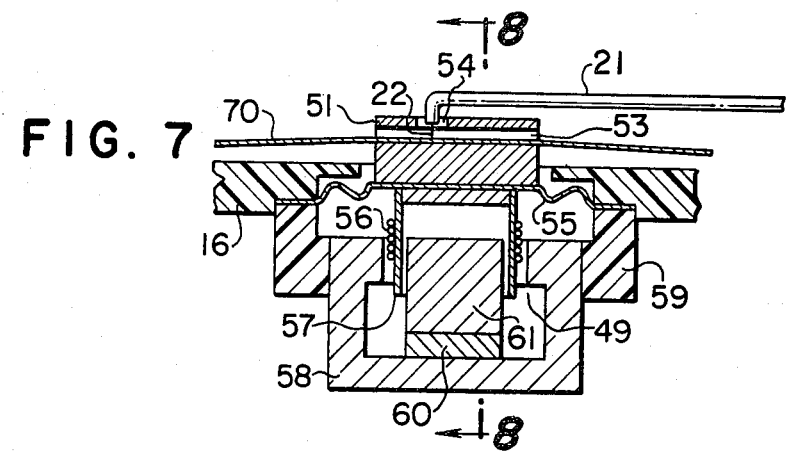
FIG. 7
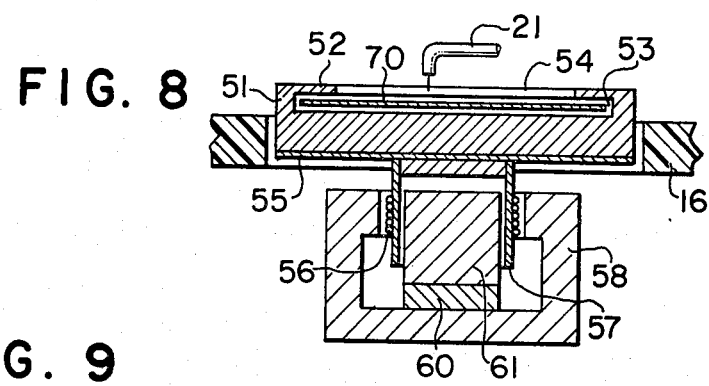
FIG. 8
FIG. 9
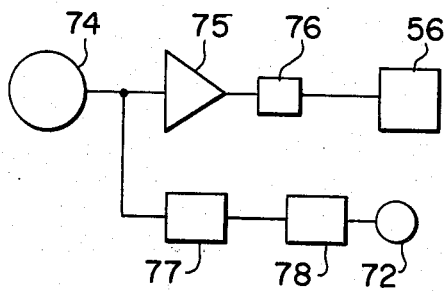
FIG. 10
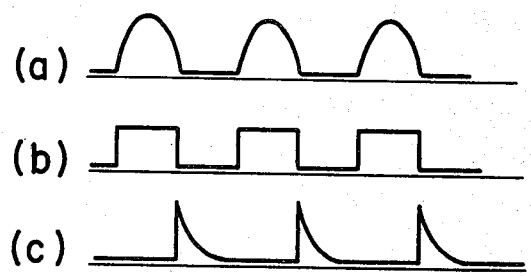

DIRECT-WRITING RECORDER

DESCRIPTION

1. Field of the Invention

The invention relates to an electrical measuring instrument, and more particularly, to a direct-writing recorder of dot type in which the location of a pointer corresponding to an input electrical quantity is intermittently printed on a record paper which moves stepwise below the pointer.

2. Description of the Prior Art

A continuous pen recorder suffers from a poor response of a pointer carrying a pen because of the increased magnitude of friction occurring between the pen and a record paper. By contrast, the problem of such friction is substantially eliminated in a recorder of the dot type since the record paper moves stepwise and dots are periodically printed during the time the record paper remains stationary. However, with the conventional recorder of the dot type which utilizes a drop frame, the period of dot printing cannot be reduced, resulting in a degraded measuring resolution. Accordingly, such recorder is inappropriate for use with the measurement of a quantity which undergoes a rapid variation. A typical example of a dot printing recorder the of drop frame type is illustrated in FIG. 1. An instrument unit 1 including a moving coil is provided with a pointer 2, the free end 6 of which is movable over a scale 5 in the similar manner as a usual indicating instrument. A record paper 8 is placed below the pointer 2, and is stepwise fed by a feeder 10 at a given time interval. A portion of the pointer 2 adjacent to the free end 6 is provided with a needle-shaped printing element 7 which is located opposite to the surface of the record paper 8 with an ink ribbon 9 interposed therebetween. A drop frame 3 is disposed above the pointer 2 and is sized sufficiently to cover the full extent of deflection of the pointer 2. The frame 3 is connected to a drive shaft 4, which undergoes an angular movement in response to a drive from an electric motor, not shown, thereby causing a vertical movement of the frame 3 at a given time interval to impact the printing element 7 against the record paper 8 through the interposed ink ribbon 9. When the operating cycle of the drop frame 3 is increased in the dot recorder of the type described, the pointer 2 is subject to a severe oscillation, and since it is clamped between the frame 3 and the record paper 8 upon each impact, it is difficult to maintain an accurate location which corresponds to the input electrical quantity. At the current status of art, commercially available products have a dot printing period which is on the order of about one second at minimum.

SUMMARY OF THE INVENTION

It is an object of the invention to provide a direct-writing recorder of the dot type which has a reduced dot printing period and a high resolution.

It is another object of the invention to provide a direct-writing recorder of the dot type having an improved response to a rapid change in an input being measured.

The direct-writing recorder of the dot type according to the invention is characterized in that an area of a record paper on which an imprint is to be formed is subject to an oscillation in a direction perpendicular to the plane of the paper at a given time interval for periodic contact with a printing element on a pointer. To realize such operation, a vibrator is disposed below the printing element and urges the record paper against the printing element as the paper passes through a printing station which comprises the vibrator and the printing element.

In a preferred embodiment of the invention, the printing station is constructed according to the principle of a discharge recording technique, and accordingly the record paper comprises a usual discharge recording paper. In accordance with such principle, the printing element on the pointer comprises a discharge electrode while the printing station is provided with a counter electrode. As the discharge recording paper moves into contact with the discharge electrode in response to a drive imparted thereto from the vibrator, a voltage applied across both electrodes causes a breakdown of a conductive layer disposed on the surface of the record paper, whereby a colored layer underlying the conductive layer is exposed. One of the greatest advantages attained with this technique is the avoidance of undesirable oscillations of pointer when the dot printing period is reduced, inasmuch as no significant contact pressure is required between the printing element and the record paper. As a consequence, it is possible to provide a direct-writing recorder of the dot type having an impact cycle which is as short as 32 dots per second and thus having a corresponding high resolution.

However, it should be understood that the invention is not limited to the use of the discharge recording technique, but similar advantage can be gained when a thermosensitive recording technique is used. The invention is also applicable to an arrangement of the writing pen type which includes a known inking unit. Therefore, it is intended that the term "printing element" as used herein covers a discharge electrode in the discharge recording technique, a thermal head in the thermosensitive recording technique and a pen in the pen writing technique.

BRIEF DESCRIPTION OF THE DRAWINGS

FIG. 7 is a cross section of a dot printer section of the recorder shown in FIG. 2;

FIG. 8 is a cross section taken along the line 8—8 shown in FIG. 7;

FIG. 9 is a block diagram of a drive control circuit associated with the recorder of FIG. 2;

FIGS. 10a and 10b graphically show the waveform of currents appearing in the circuit of FIG. 9;

FIG. 10c graphically illustrates the speed of rotation of the motor shown in FIG. 9;

DESCRIPTION OF PREFERRED EMBODIMENTS

Figure 2:
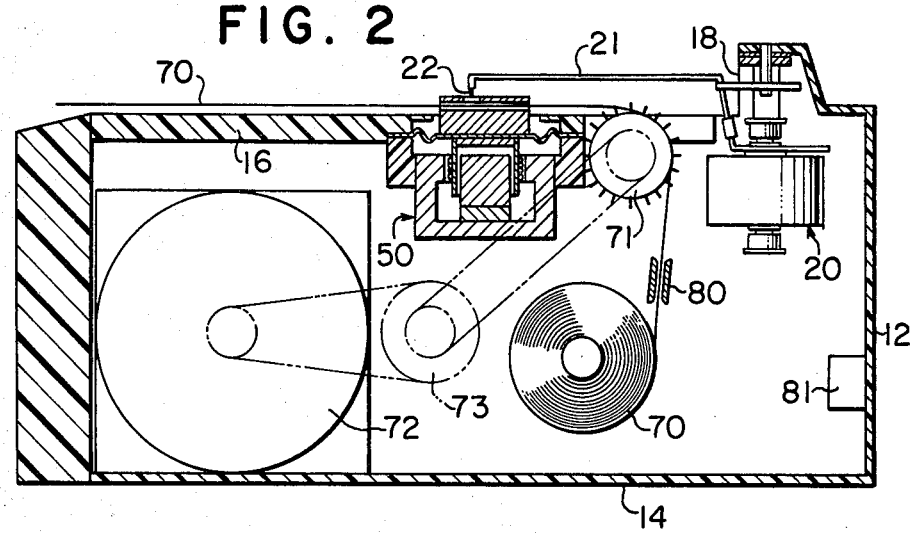
FIG. 2 is a schematic cross section of a direct-writing recorder of dot type according to the invention.

Referring to FIG. 2, there is schematically shown a direct-writing recorder of the dot type according to the invention which is constructed according to the discharge recording technique. The recorder includes a housing 12 in which an instrument unit 20 is disposed. The instrument unit 20 includes a pointer 21 which extends externally of the housing through a window 18 formed therein. On its free end, the pointer 21 carries a discharge electrode 22, below which an electromagnetic vibrator unit 50 is disposed and supported by a top plate 16 of the housing 12. A record medium in the form of a roll of discharge record paper 70 is disposed within the housing 12, and the record paper 70 extends around a sprocket wheel 71 to be pulled out through the window 18 to pass through a printer section defined by the combination of the discharge electrode 22 and the vibrator unit 50. The sprocket wheel 71 is operatively connected with a pulse motor 72 through a pulley 73, and the angular movement of the motor 72 causes the record paper 70 to be fed forward stepwise with a given period. The vibrator unit 50 is energized with the same period as the stepping period of the record paper 70 for periodically causing successive print areas of the record paper 70 to be urged against the discharge electrode 22. As will be further described later, the discharge electrode 22 is electrically connected to an electrical terminal 81 through the pointer 21. A counter electrode 80 is disposed for sliding or rolling contact with the record paper 70, and is also connected to the terminal 81.

Figure 3:
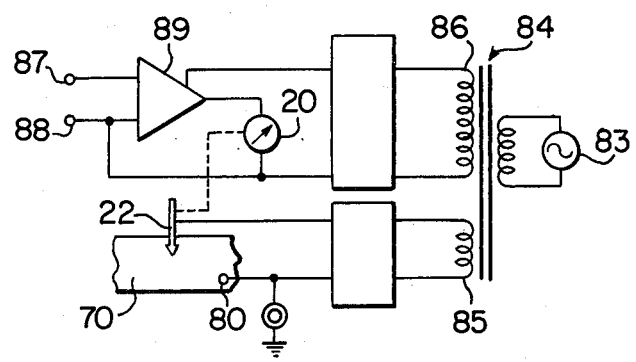
FIG. 3 is a circuit diagram of a power supply used in the recorder shown in FIG. 2.

In a desirable manner of operation, the vibrator unit 50 drives the record paper 70 into contact with the discharge electrode 22 during a pause interval in the stepping cycle of the record paper 70. Referring to FIG. 3, there is shown a transformer having its primary connected to a power source 83 and having its secondary winding 85 connected to apply a recording voltage across the discharge and the counter electrode 22, 80. When the path across the both electrodes is short-circuited by a conductive surface layer of the record paper 70, the discharge electrode 22 causes the conductive layer to be destroyed locally, thus allowing its underlying colored layer to be exposed. The instrument unit 20 is connected to the output of an amplifier 89 which has its inputs connected across a pair of input terminals 87, 88 across which a measurement of an input electrical quantity is applied. In this manner, the pointer 21 is driven, together with the discharge electrode 22, in accordance with the magnitude of such input quantity. It will be noted that the instrument unit 20 is fed from another secondary winding 86 of the transformer 84.

Figure 4:
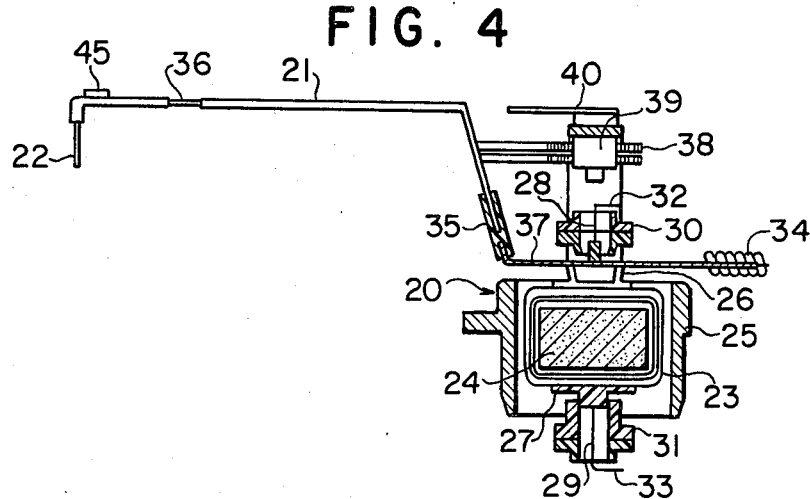
FIG. 4 is a cross section of an instrument unit which is preferred for use in the recorder shown in FIG. 2.
Figure 5:
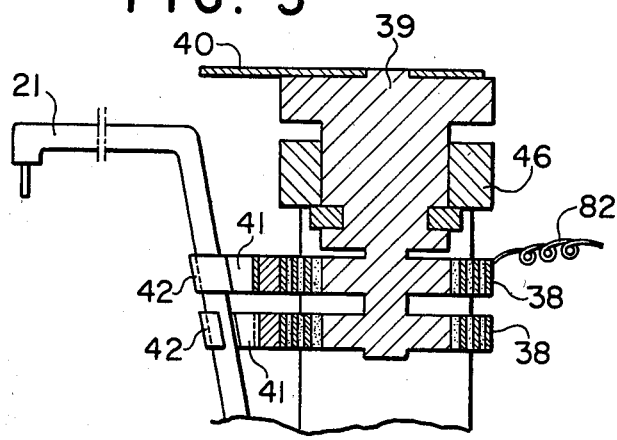
FIG. 5 is an enlarged view of braking springs of the instrument unit shown in FIG. 4.
Figure 6:
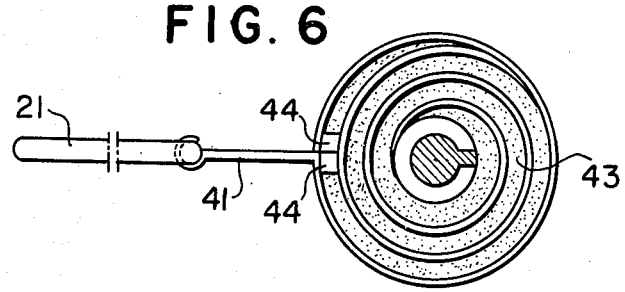
FIG. 6 is a cross section of the braking springs shown in FIG. 5.

FIGS. 4, 5 and 6 illustrate an electrical instrument of the moving coil type which is preferred for use as the instrument unit 20 of the recorder according to the invention, but it should be understood that any other electrical instrument of moving iron type may also be used instead. The instrument unit 20 shown includes a moving coil 23 which is suspended by a pair of vertically aligned taut bands 28, 29 for angular movement together with a pointer assembly. The moving coil 23 is disposed in a gap formed between a cylindrical permanent magnet 24 and a hollow cylindrical magnetic yoke 25, and operates in a manner which is well known in itself. The pointer assembly includes a support plate 37 which is securely connected to the moving coil 23 by an element 26, with a pointer 21 being connected to the plate 37 through an electrically insulating connector 35. The upper taut band 28 has its one end anchored to a boss on the support plate 37, and the lower taut band 29 has its one end anchored to a boss 27 which is mounted on the moving coil 23. The other ends of the taut bands 28, 29 are secured to leaf springs 32, 33 which are mounted on support frames 30, 31, respectively. The pointer 21 comprises a conductive metal such as aluminium, carrying a discharge electrode 22 on its free end. The discharge electrode 22 may be in the form of a rod of tungsten and having a diameter on the order of 0.2 mm. A resilient section 36 may be formed in the pointer 21 in order to alleviate oscillations which are caused to the pointer 21 as a result of a periodic contact between the discharge electrode 22 and the record paper. The resilient section 36 may be formed of a carbon fiber, for example. In this instance, the free end of the pointer 21 may be provided with a counter weight 45.

A pair of spiral springs 38 formed of a conductive metal and wound in opposite directions are associated with the pointer 21 to provide a braking action thereon. The springs 38 are concentrically disposed on a collet boss 39 which is in turn pivotally mounted on a support bracket 46, with a free end 41 of each spring 38 being formed with a grip 42 which is mechanically and electrically connected with the pointer 21. A lead wire 82 has its one end connected to the electrical terminal 81 (see FIG. 1) and its other end soldered to one of the springs 38. Consequently, the discharge electrode 22 is connected to a power source through the pointer 21. The springs 38 are packed with a damper 43 formed by a body of viscous fluid, for example, silicone grease. A seal member 44 is soldered to the end of each spring 38 to prevent the leakage of the viscous fluid 43. It is to be noted that a zero adjust lever 40 for the pointer 21 is mounted on the collet boss 39.

In the instrument unit 20 mentioned above, when an input to be determined is applied to the moving coil 23 through the taut bands 28, 29, a rotating torque is produced therein to cause the pointer 21 to move angularly until the torque is balanced by the imbalance torque of the pair of spiral springs 38 and the torsion torque of the taut bands 28, 29. During a periodic contact occurring between the discharge electrode 22 and the record paper, the pointer 21 is subject to an oscillation in a direction perpendicular to the direction of its deflection, and such oscillation has a component, though small in magnitude, in the direction of deflection which has a direct adverse influence upon the accuracy of the record made. However, it is found that the use of spiral springs 38 packed with the viscous fluid 43 achieves an attenuation of such oscillation component occurring in the direction of deflection to a negligible value.

Figure 1:
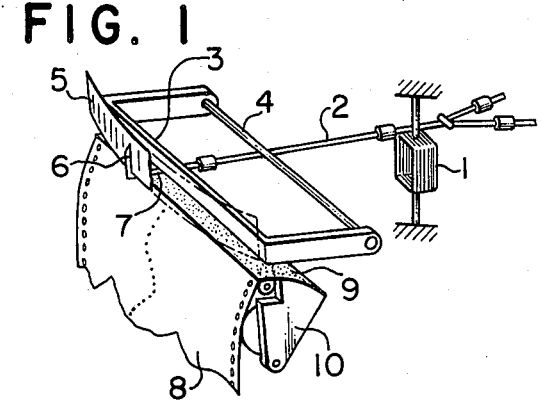
FIG. 1 is a perspective view of a conventional arrangement.

The operation of the printer section shown in FIG. 2 will be apparent by reference to FIGS. 7 and 8. The electromagnetic vibrator unit 50 includes a support bracket 59 which is firmly mounted on the top plate 16 of the housing, and the bracket 59 carries a corrugated diaphragm 55 which in turn carries a vibrator plate 51. The vibrator plate 51 is integrally provided with an upper cover member 52 in which a slit or opening 54 is formed for cooperation with the pointer 21, with a gap 53 of a reduced length formed between the upper cover and the vibrator plate 51 to allow the passage of the record paper 70 therethrough. When the vibrator unit 50 is deenergized, the vibrator plate 51 is located to maintain the record paper 70 at a distance from the discharge electrode 22, leaving a suitable clearance between the electrode 22 and the record paper 70, as shown in FIGS. 1 and 8. When the vibrator unit 50 is energized, the vibrator plate 51 is moved to a position shown in FIG. 7 where it causes the record paper 70 to contact the discharge electrode 22. The diaphragm 55 may be formed of a material such as a cone paper used to form a loudspeaker. In the example shown, it is rectangular in configuration and is sized to fit the configuration of the vibrator plate 51, and has its longitudinal ends secured to the support bracket 59 while its crosswise ends are left free. As will be noted, the corrugated ribs are formed adjacent to the longitudinal ends. The support bracket 59 also carries a magnetic yoke 58 in the form of a hollow cylinder having a bottom, with a disc-shaped permanent magnet 60 and a solid cylindrical pole piece 61 disposed therein in concentric relationship therewith. Formed between the magnetic yoke 58 and the pole piece 61 is an annular gap 49, in which a coil 56 disposed on a bobbin 57 carried by the diaphragm 55 is disposed so as to be oscillatable in the axial direction thereof. Such construction of the vibrator unit 50 is similar to a focus adjusting arrangement used for a pick up assembly associated with an optical information record medium. An oscillating current is supplied to the coil 56, whereupon the vibrator plate 51 oscillates in the axial direction of the coil 56 for causing a periodic contact of the record paper 70 with the discharge electrode 22. It will be appreciated that the vibrator unit 50 may be constructed as a moving iron type in a similar manner as a contactless electromagnetic buzzer.

Referring to FIG. 9, there is shown a circuit arrangement for energizing the vibrator unit 50 in synchronism with a paper feed pulse motor 72. Specifically, the coil 56 of the vibrator unit 50 is fed from an a.c. power source 74 through a power amplifier 75 and a half-wave rectifier 76. The pulse motor 72 is also fed from the power source 74 through a waveform translating circuit 77 such as a Schmidt trigger and an energization control circuit 78. The circuit arrangement is adapted to feed a half-wave rectified current as shown in FIG. 10a to the coil 34 and to feed the pulse motor 72 with a rectangular wave current as illustrated in FIG. 10b which is synchronized with the current supplied to the coil. The motor is designed to initiate its angular movement stepwise, as illustrated in FIG. 10c, for each falling end of the rectangular current pulse. Accordingly, the vibrator unit 50 may be energized to drive the record paper into contact with the discharge electrode during the pause interval in the stepping cycle of the record paper. Alternatively, the record paper may be stepped forward during the time the vibrator unit 50 remains deenergized. It should be understood that the coil 56 may be fed with a pulse current or triangular current of a low duty cycle rather than the half-wave rectified current shown in FIG. 10a.

Figure 11:
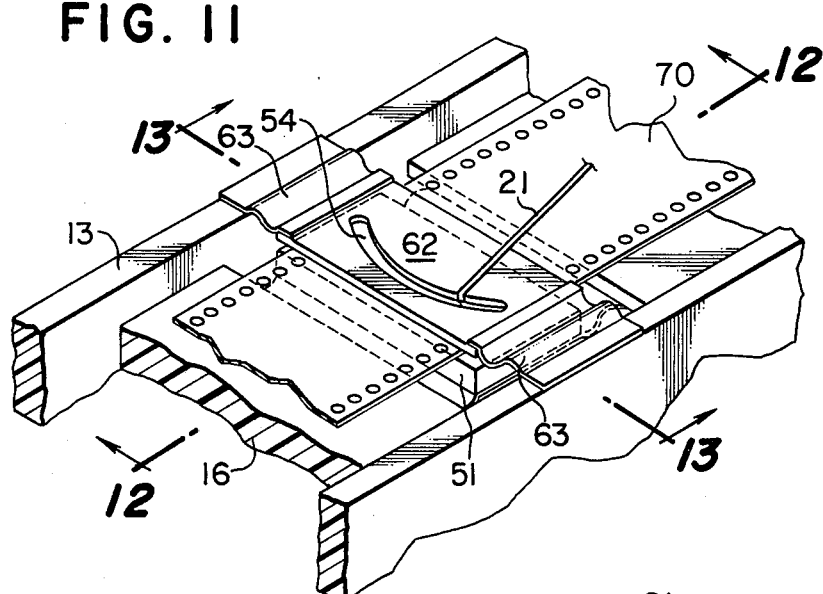
FIG. 11 is a perspective view of a dot printer section which is slightly different from that shown in FIG. 7.
Figure 12:
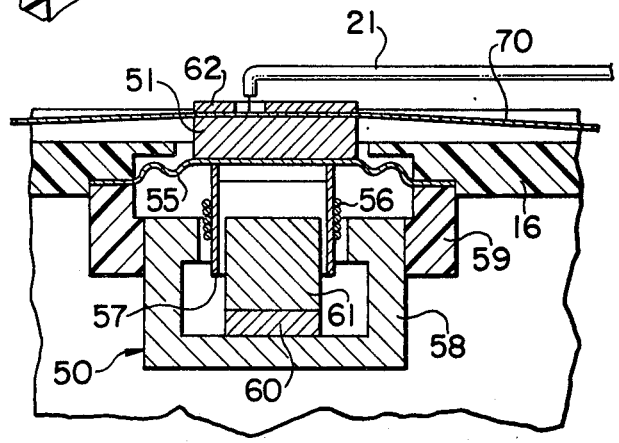
FIG. 12 is a cross section taken along the line 12—12 shown in FIG. 11.
Figure 13:
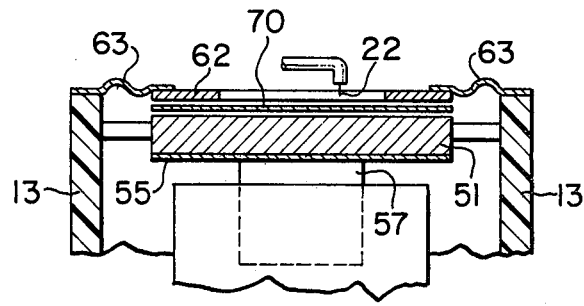
FIG. 13 is a cross section taken along the line 13—13 shown in FIG. 11.

FIGS. 11, 12 and 13 illustrate a modification of the printer section. It should be noted that in these and subsequent Figures, parts corresponding to those mentioned above are designated by like reference numerals. The printer section illustrated is characterized in that a cover plate or member 62 is disposed above the vibrator plate 51 separately from the latter. The cover plate 62 is supported by the opposite sidewalls 13 of the housing by means of flexible resilient sheet members 63, and is located to be spaced from the vibrator plate 51 whenever the vibrator unit 50 remains deenergized. The record paper 70 is guided to pass through the gap formed between the vibrator plate 51 and the cover plate 62, but as the vibrator unit 50 is energized to cause the vibrator plate 51 to push the record paper 70 up, the record paper 70 becomes held between the vibrator plate 51 and the cover plate 62, thus allowing any printing error to be eliminated which might result from a displacement of the record paper 70 during the dot printing operation.

Figure 14:
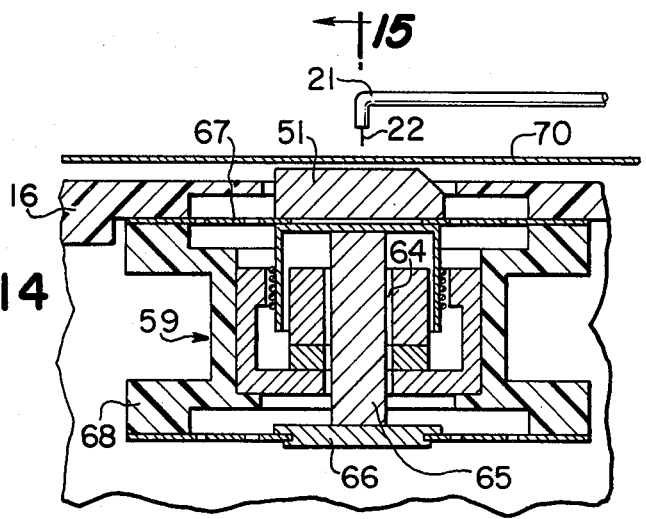
FIG. 14 is a cross section of another embodiment of dot printer section.
Figure 15:
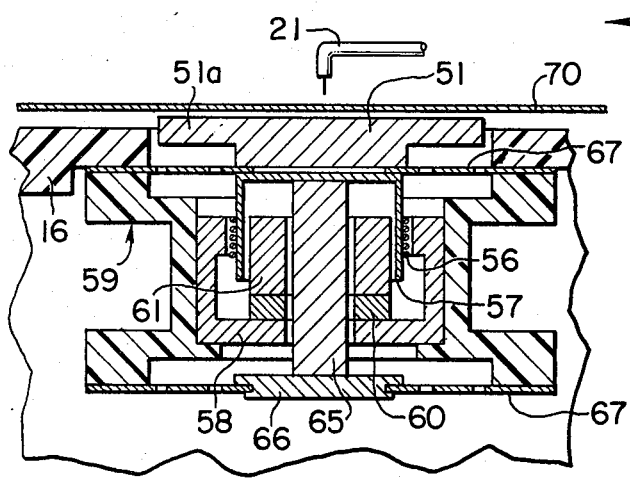
FIG. 15 is a cross section taken along the line 15—15 shown in FIG. 14.
Figure 16:
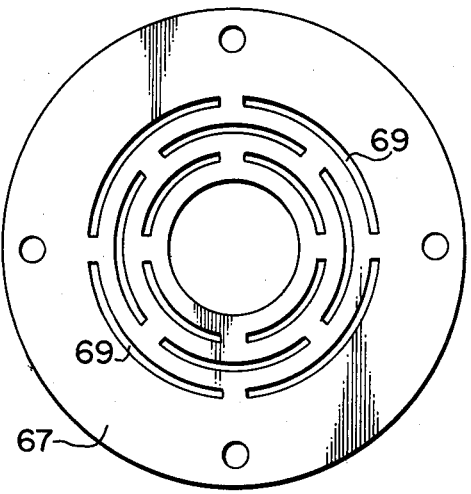
FIG. 16 is a plan view of the support diaphragm shown in FIG. 14.

FIGS. 14, 15 and 16 show a printer section including a vibrator unit which is slightly different from the vibrator unit 50 mentioned above. The improved vibrator unit 50 includes a diaphragm 67 carrying a vibrator plate 51. The diaphragm 67 is formed of a flat resilient metal sheet having a plurality of arcuate slits 69 formed therein in concentric manner about the center thereof. This diaphragm 67 is firmly coupled to another diaphragm of the same configuration with a rod 65 interposed therebetween which extends through an opening 64 formed in alignment with the axis of members 58, 60, 61 of the magnetic circuit. The peripheral edge of the both diaphragms 67 are secured to an annular flange 68 which is formed on the opposite ends of the support bracket 59. The vibrator plate 51 includes a boss (see FIG. 15) which is aligned with the axis of the connecting rod 65 and which includes a laterally extending wing 51a. The use of the pair of diaphragms 67 to support the vibrator plate 51 in this manner is advantageous in eliminating undesirable motions of the vibrator plate 51 such as a transverse oscillation or tilting which might cause an oscillation of the pointer 21 in a direction of its deflection or which might cause a non-uniform contact between the discharge electrode 22 and the record paper 70 within the extent defined by the amplitude of the pointer 21.

Figure 17:
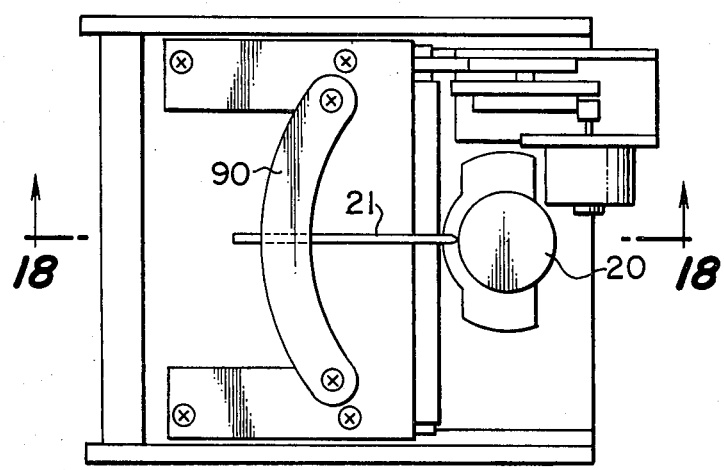
FIG. 17 is a plan view of a direct-writing recorder of dot type including a pointer retaining plate.
Figure 18:
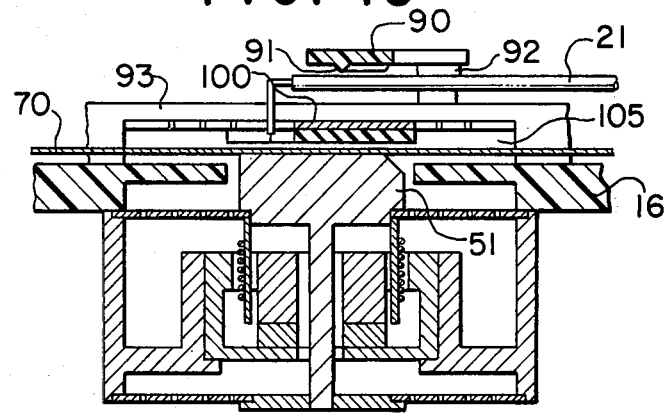
FIG. 18 is a cross section taken along the line 18—18 shown in FIG. 17.
Figure 19:
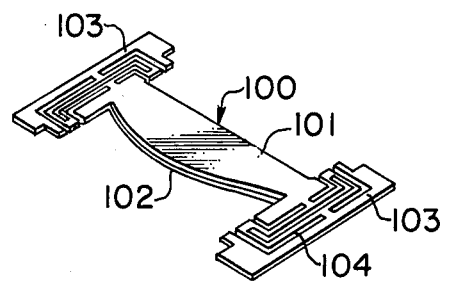
FIG. 19 is a perspective view of the counter electrode unit shown in FIG. 18.

FIGS. 17, 18 and 19 shown another embodiment of the printing section. This embodiment includes two improvements. One of the improvements relates to the provision of a plate 90 which suppresses a displacement of the pointer 21 which might otherwise occur during a shift of the record paper 70 relative to the discharge electrode 22, in consideration of the fact that the discharge between the discharge electrode 22 and the record paper 70 can be reliably achieved by slightly increasing the pressure of contact between the electrode 22 and the paper 70. The suppressor plate 90 is located above a portion of the pointer 21 adjacent to its free end and lies in a plane parallel to the plane in which the pointer 21 moves so as to cover the full extent of movement thereof. When the vibrator unit 50 is deenergized, a gap is formed between the pointer 21 and the suppressor plate 90, but when the vibrator 50 is energized to move the record paper 70 into contact with the discharge electrode 22 which is then raised up, the pointer 21 is subject to the action of the suppressor plate 90. The suppressor plate 90 may be lengthwise formed with a rib 91, against which the pointer 21 is adapted to abut. The suppressor plate 90 may be mounted on a table 93 of the housing by utilizing a boss 92.

The second improvement relates to the provision of a counter electrode unit 100 of an intermittent contact type which is substituted for the counter electrode 80 of the sliding or rotary contact type mentioned above in connection with FIG. 2. The counter electrode unit 100 is best shown in FIG. 19, and as shown, it comprises a flat resilient support plate 101, and a sheet-like electrode 102 such as may be formed from conductive rubber which is applied to the rear surface of the support plate 101. The opposite ends of the resilient support plate 101 are formed with a plurality of slits 104 therein, thus integrally forming mounting portions 103 which have a degree of resilience. Referring to FIG. 18, it will be noted that the counter electrode unit 100 is disposed across the path of the record paper 70 above the vibrator plate 51 so that the surface of the sheet-like electrode 102 lies in substantially the same plane as the end of the discharge electrode 22 on the pointer 21. The mounting portions 103 are secured to supports 105 formed on the top plate 16 on the opposite sides of the path of the record paper 70. While not shown, the sheet-like electrode 102 is connected to the electrical terminal 81 (FIG. 2) by a lead wire. With this counter electrode unit 100, when the vibrator unit 50 is deenergized, the record paper 70 remains out of contact with the sheet electrode 102, but as the vibrator 50 is energized. The record paper 70 moves into contact with the sheet electrode substantially at the same time as it contacts the discharge electrode 22, thus forming a closed loop. An advantage gained by such periodic or intermittent contact is the alleviation of various troubles caused by deposition of dust on the electrode surface from the record paper 70, allowing the torque to be reduced which is required to feed the record paper 70 forward.

While several preferred embodiments of the invention have been disclosed in detail, it should be understood that they are illustrative only, and not limitative of the scope of the invention.

I claim:

1. In a direct-writing dot type recorder: printing means including a movable printing element for dot printing on a record medium; feeding means for intermittently feeding in a stepwise manner a record medium so as to intermittently position successive print areas of the record medium in spaced-apart relationship from the printing element; and means synchronized with the intermittent feeding of the record medium for periodically displacing the record medium toward the printing element so as to bring successive print areas of the record medium into contact with the printing element during the successive pause intervals occurring between the intermittent feeding motion of the record medium, said means for periodically displacing the record medium comprising an electromagnetic vibrator unit including a vibratable vibrator plate, a cover member attached to the vibrator plate, means defining a gap between the cover member and the vibrator plate and through which extends the record medium, means defining an opening in the cover member for receiving therethrough the printing end of the printing element, and electromagnetic means responsive to an electrical drive signal for electromagnetically vibrating the vibrator plate to effect displacement of the record medium toward the printing element to bring the record medium into contact with the printing end of the printing element.

2. A recorder according to claim 1; including means mounting the printing element for movement in a lateral direction with respect to the feeding direction of the record medium.

3. A recorder according to claim 1; wherein the means for periodically displacing the record medium includes means for periodically displacing the record medium at a rate as high as on the order of 32 times per second.

4. A recorder according to claim 1; wherein the record medium comprises a discharge recording paper having a conductive surface layer and an intermediate colored layer, and the printing element comprises a discharge electrode; and further including a counter electrode disposed to make contact with the conductive surface layer of the discharge recording paper at least during the time the latter contacts the printing element; and means for applying a voltage across the discharge electrode and the counter electrode to effect a discharge breakdown of the conductive surface layer.

5. In a direct-writing dot type recorder: printing means including a movable printing element for dot printing on a record medium; feeding means for intermittently feeding in a stepwise manner a record medium so as to intermittently position successive print areas of the record medium in spaced-apart relationship from the printing element; and means synchronized with the intermittent feeding of the record medium for periodically displacing the record medium toward the printing element so as to bring successive print areas of the record medium into contact with the printing element during the successive pause intervals occurring between the intermittent feeding motion of the record medium, said means for periodically displacing the record medium comprising an electromagnetic vibrator unit including a vibratable vibrator plate, a cover member disposed in spaced relation from the vibrator plate, means defining a gap between the cover member and the vibrator plate and through which extends the record medium, means defining an opening in the cover member for receiving therethrough the printing end of the printing element, and electromagnetic means responsive to an electrical drive signal for electromagnetically vibrating the vibrator plate to effect displacement of the record medium toward the printing element to bring the record medium into contact with the printing end of the printing element.

6. A recorder according to claim 5; including means mounting the printing element for movement in a lateral direction with respect to the feeding direction of the record medium.

7. A recorder according to claim 5; wherein the means for periodically displacing the record medium includes means for periodically displacing the record medium at a rate as high as on the order of 32 times per second.

8. A recorder according to claim 5; wherein the record medium comprises a discharge recording paper having a conductive surface layer and an intermediate colored layer, and the printing element comprises a discharge electrode; and further including a counter electrode disposed to make a contact with the conductive surface layer of the discharge recording paper at least during the time the latter contacts the printing element; and means for applying a voltage across the discharge electrode and the counter electrode to effect a discharge breakdown of the conductive surface layer.

9. A recorder according to claim 5; including means flexibly mounting the cover member so that when the vibrator plate effects displacement of the record medium toward the printing element to bring the record medium into contact with the printing end of the printing element, the record medium becomes temporarily sandwiched between the vibrator plate and the cover member thereby eliminating any printing error which could otherwise occur due to displacement of the record medium during printing.

* * * * *